United States Patent [19]

Miale et al.

[11] Patent Number: 4,500,418

[45] Date of Patent: Feb. 19, 1985

[54] CATALYSIS OVER ACTIVATED INORGANIC OXIDES

[75] Inventors: Joseph N. Miale, Lawrenceville; Clarence D. Chang, Princeton, both of N.J.

[73] Assignee: Mobil Oil Corporation, New York, N.Y.

[21] Appl. No.: 552,547

[22] Filed: Nov. 16, 1983

Related U.S. Application Data

[63] Continuation-in-part of Ser. No. 355,414, Mar. 8, 1982, Pat. No. 4,427,791.

[51] Int. Cl.³ .................... C10G 11/04; C10G 11/08; C10G 45/46
[52] U.S. Cl. .................................. 208/114; 208/115; 208/122; 585/408; 585/415; 585/463; 585/465; 585/470; 585/480; 585/654
[58] Field of Search ............... 208/112, 122, 123, 124, 208/120, 111, 114, 115

[56] References Cited

U.S. PATENT DOCUMENTS

| | | | |
|---|---|---|---|
| 2,681,305 | 6/1954 | Sweetser | 208/120 |
| 3,301,793 | 1/1967 | Adams et al. | 208/111 |
| 3,975,299 | 8/1976 | Crathorne et al. | 208/120 |
| 4,054,511 | 10/1977 | Miale et al. | 208/120 |

Primary Examiner—Delbert E. Gantz
Assistant Examiner—O. Chaudhuri
Attorney, Agent, or Firm—Alexander J. McKillop; Michael G. Gilman; Dennis P. Santini

[57] ABSTRACT

A process is provided for conducting organic compound conversion over a catalyst comprising alumina and/or gallia which has been treated by a method which comprises contact with ammonium or boron fluoride reagent, contact with a particular aqueous ammonium exchange solution, and thereafter calcination.

8 Claims, No Drawings

4,500,418

CATALYSIS OVER ACTIVATED INORGANIC OXIDES

CROSS-REFERENCE TO RELATED CASES

This application is a continuation-in-part of application Ser. No. 355,414, filed Mar. 8, 1982, now U.S. Pat. No. 4,427,791.

BACKGROUND OF THE INVENTION

1. Field of the Invention

This invention relates to a process for conducting organic compound conversion over a catalyst comprising an inorganic oxide material such as alumina or gallia which has been treated by a method which involves the steps of contacting the inorganic oxide material with a reagent selected from the group consisting of ammonium fluoride and boron fluoride, contacting the reagent contacted material with an aqueous ammonium exchange solution such as ammonium hydroxide or salt, and calcining the ammonium hydroxide or salt solution contacted material.

2. Description of Prior Art

The inorganic oxide material alumina has been provided with catalytic activity in the past by contacting same with boron fluoride ($BF_3$). The contacting has been followed by hydrolysis and calcination. Crystalline aluminosilicates such as zeolites X and Y have been enhanced in catalytic activity by treatment with volatile metal halides. This is shown in U.S. Pat. Nos. 3,354,078 and 3,644,220.

The present inorganic oxide material treating method, however, provides various inorganic oxides, such as alumina and gallia, with significantly higher acid catalytic activity than prior art methods. This makes it possible to supply matrices of much wider range of acidity levels for commercial zeolite catalysts for use in cracking, alkylation and isomerization reactions.

SUMMARY OF THE INVENTION

The present invention relates to a novel process for converting organic compounds over a catalyst comprising certain inorganic oxide material, such as alumina or gallia, having enhanced acid activity by way of treatment of said material which comprises the sequential steps of contacting said material with ammonium fluoride or volatile boron fluoride, contacting the boron fluoride or ammonium fluoride contacted material with an aqueous ammonium exchange solution such as the hydroxide or salt, e.g. nitrate, and calcining said ammonium exchange solution contacted material. The resulting material exhibits enhanced Bronsted acidity and, therefore, improved acid activity toward catalysis of numerous chemical reactions, such as, for example, alkylation, transalkylation, cracking or isomerization of organic, e.g. hydrocarbon, compounds. This enhanced acid activity material is useful as matrix or support for various zeolite materials in the manufacture of catalyst for acid catalyzed organic compound conversion processes.

DESCRIPTION OF SPECIFIC EMBODIMENTS

This is a continuation-in-part of the application resulting in U.S. Pat. No. 4,427,791, incorporated herein by reference in its entirety. The catalyst for use in the present process comprises an inorganic oxide material which has undergone treatment which enhances acid catalytic activity thereof. That treatment involves contacting the inorganic oxide material with a reagent of ammonium fluoride or volatile boron fluoride at a temperature of from about 0° C. to about 100° C., preferably from about ambient to about 50° C. The boron or ammonium fluoride contacted material is then contacted with an aqueous ammonium hydroxide or salt solution, e.g. 1N $NH_4NO_3$ or 1N $NH_4OH$, and thereafter calcined at a temperature of from about 200° C. to about 600° C. in an inert atmosphere of air, nitrogen, etc. at subatmospheric, atmospheric or superatmospheric pressures for from about 1 minute to about 48 hours.

The fluoride reagent contacting step may be accomplished by admixture of volatile boron fluoride or boron fluoride etherate with an inert gas such as nitrogen or helium at temperatures ranging from about 0° C. to about 100° C. It may be accomplished by vacuum impregnation of the inorganic oxide material with ammonium fluoride in water. The amount of fluoride reagent which is utilized is not narrowly critical but usually from about 0.2 to about 2 grams of boron fluoride or ammonium fluoride are used per gram of inorganic oxide material.

The aqueous ammonium exchange solution contacting step may be conducted for a period of time of from about 1 hour to about 20 hours at a temperature of from ambient to about 100° C. The actual ammonium exchange material which may be used is not narrowly critical and will normally be an inorganic salt, such as ammonium nitrate, ammonium sulfate, ammonium chloride, etc., or ammonium hydroxide The use of boron fluoride in the presence of siliceous materials is a problem because boron fluoride is easily hydrolyzed and the HF thereby released attacks silica. Therefore, the inorganic oxide to be treated hereby with boron fluoride will not include silica or mixtures involving silica. If the inorganic oxide material does comprise silica, the present method utilizing a reagent of ammonium fluoride would be the desired procedure.

The inorganic oxide material to be acid activity enhanced by the above method may, if desired, be calcined prior to fluoride reagent contact at a temperature of from about 200° C. to about 600° C. in an atmosphere of air, nitrogen, etc. for between 1 minute and 48 hours.

The activity enhanced inorganic oxide material prepared by the above method is useful as a catalyst component for acid catalyzed organic compound conversion reactions. In general, organic compounds such as, for example, those selected from the group consisting of hydrocarbons, alcohols and ethers, are converted to conversion products such as, for example, aromatics and lower molecular weight hydrocarbons, over the activity enhanced material prepared as above by contact under organic compound conversion conditions including a temperature of from about 100° C. to about 800° C., a pressure of from about 0.1 atmosphere (bar) to about 200 atmospheres, a weight hourly space velocity of from about 0.08 $hr^{-1}$ to about 2000 $hr^{-1}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmosphere,, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to abut 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheric, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In practicing a particularly desired chemical conversion process, it may be useful to incorporate the above-described activity enhanced inorganic oxide material, especially when used as matrix in a zeolite-containing catalyst composition, with additional matrix comprising another material resistant to the temperature and other conditions employed in the process. Such additional matrix material is useful as a binder and imparts additional resistance to the catalyst for the severe temperature, pressure and reactant feed stream velocity conditions encountered in many cracking processes.

Useful additional matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing additional matrix materials, the catalyst employed herein may be composited with an additional porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The additional matrix may be in the form of a cogel. The relative proportions of activity enhanced inorganic oxide component and additional matrix, on an anhydrous basis, may vary widely with the activity enhanced material content of the overall catalyst ranging from about 1 to about 99 percent by weight and more usually in the range of about 5 to about 80 percent by weight of the total dry composite.

The following examples will illustrate the novel method of the present invention.

EXAMPLE 1

A one gram sample of Kaiser gamma-alumina was vacuum impregnated with 0.9 grams of ammonium fluoride ($NH_4F$) in water at a temperature of 25° C. It was noted that during this step considerable ammonia was evolved. After 30 minutes contact, the ammonium fluoride contacted material was dried at 130° C., and then treated three times with 1N aqueous ammoniun nitrate ($NH_4NO_3$) solution. Each ammonium nitrate contact was followed by water washing. The finally washed material was then dried at 130° C. and calcined for 30 minutes at 538° C. in air.

EXAMPLE 2

A one gram sample of the same alumina as used in Example 1 was saturated with boron fluoride ($BF_3$). The $BF_3$ addition was carried out at 25°-95° C. The saturation point was determined as the point at which heat of adsorption no longer evolved. Any further addition of the $BF_3$ at this point would have actually cooled the alumina. At the saturation point the flow of boron fluoride was stopped and 25° C. (ambient) air was drawn through the alumina for 30 minutes. The boron fluoride contacted material was then dried at 130° C. for 30 minutes to remove the last traces of unreacted or lightly held boron fluoride. The dried material was then treated with 1N aqueous solution of $NH_4NO_3$ and calcined as in Example 1.

EXAMPLE 3

A sample of UPO bimodal gamma-alumina beads was treated with $BF_3$ as in Example 2 without $NH_4NO_3$ treatment. The boron fluoride contacted alumina was calcined as above. This was a prior art method for alumina activation conducted for comparison purposes.

EXAMPLE 4

Another sample of the bimodal alumina beads was treated with $BF_3$ as in Example 3, hydrolyzed with demineralized water and calcined as above. There was no aqueous ammonium hydroxide or salt treatment. This, again, was a prior art method for alumina activation conducted for comparison pruposes.

EXAMPLE 5

Another sample of the bimodal alumina beads was treated as in Example 2.

EXAMPLE 6

The final product inorganic oxide materials from Examples 1 through 5 along with samples of the two aluminas used (untreated) were subjected to the Alpha Test with results listed below:

| Products of Example | Alpha Value |
| --- | --- |
| gamma-alumina (base) | 0.2 |
| bimodal alumina beads (base) | 0.2 |
| 1 ($NH_4F/NH_4NO_3$/calcination) | 4.5 |
| 2 ($BF_3/NH_4NO_3$/calcination) | 15 |
| 3 ($BF_3$/calcination) | 2.8 |
| 4 ($BF_3/H_2O$/calcination) | 8.7 |
| 5 ($BF_3/NH_4NO_3$/calcination) | 23 |

It is observed from the above results that the above method is highly useful for enhancing acid catalytic activity of certain inorganic oxide materials for use as catalyst components in the present process. Comparison of the Alpha Values for the products of Examples 1 and 2 with that of untreated gamma-alumina indicates a 2150 to 7400 percent enhancement in activity. Comparison of the Alpha Value for the product of Example 5 with that of untreated bimodal alumina beads indicates a 11,400 percent enhancement in activity. Comparison of the results for Example 5 material with those for the materials of Examples 3 and 4 show the improvement provided by the present method over the prior art techniques.

As is known in the art, the Alpha value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (rate constant=0.016).

The Alpha Test is described in U.S. Pat. No. 3,354,078 and in The Journal of Catalysis, Vol. IV, pp. 522-529 (August 1965).

What is claimed is:

1. A process for converting a feedstock comprising hydrocarbon compounds to conversion products comprising hydrocarbon compounds of lower molecular weight than feedstock hydrocarbon compounds which comprises contacting said feedstock at conversion conditions with a catalyst comprising an inorganic oxide material selected from the group consisting of alumina and gallia treated by a method comprising contacting said material with a fluoride reagent selected from the group consisting of ammonium fluoride and boron fluoride at a temperature of from about 0° C. to about 100° C., contacting said fluoride reagent contacted material with an aqueous ammonium exchange solution and thereafter calcining said material at a temperature of from about 200° C. to about 600° C.

2. The process of claim 1 wherein said aqueous ammonium exchange solution is selected from the group consisting of ammonium hydroxide and an ammonium salt.

3. The process of claim 2 wherein said ammonium salt is selected from the group consisting of ammonium nitrate, ammonium sulfate and ammonium chloride.

4. The process of claim 1 wherein said inorganic oxide material is calcined prior to contact with the fluoride reagent at a temperature of from about 200° C. to about 600° C.

5. The process of claim 1 wherein said fluoride reagent contacting is at a temperature of from about ambient to about 50° C.

6. The process of claim 1 wherein said alumina is gamma-alumina.

7. The process of claim 1 wherein said inorganic oxide material is in the form of beads.

8. The process of claim 1 wherein said conversion conditions include a temperature of from about 300° C. to about 800° C., a pressure of from about 0.1 atmosphere to about 35 atmospheres and a weight hourly space velocity of from about 0.1 $hr^{-1}$ to about 200 $hr^{-1}$.

* * * * *

UNITED STATES PATENT AND TRADEMARK OFFICE
CERTIFICATE OF CORRECTION

PATENT NO. : 4,500,418
DATED : February 19, 1985
INVENTOR(S) : Joseph N. Miale and Clarence D. Chang It is certified that error appears in the above-identified patent and that said Letters Patent is hereby corrected as shown below:

Col. 4, line 60, "UPO" should be --UOP--.

Col. 6, line 44, "200" should be --20--.

Signed and Sealed this

Eighteenth Day of June 1985

[SEAL]

Attest:

DONALD J. QUIGG

Attesting Officer    Acting Commissioner of Patents and Trademarks